United States Patent [19]

Molinatto

[11] Patent Number: 4,477,954
[45] Date of Patent: Oct. 23, 1984

[54] PRESSURE ROLLERS WITH LONGITUDINAL AXIS OF VARIABLE SHAPE

[75] Inventor: Bruno Molinatto, Montalto Dora, Italy

[73] Assignee: Componenti Grafici S.r.l., Turin, Italy

[21] Appl. No.: 469,525

[22] Filed: Feb. 24, 1983

[30] Foreign Application Priority Data

Mar. 3, 1982 [IT] Italy ............................ 67239 A/82

[51] Int. Cl.³ ............................................. B21B 13/02
[52] U.S. Cl. ............................ 29/116 AD; 29/116 R; 29/110
[58] Field of Search .............. 100/162 B; 29/116 AD, 29/116 R, 110

[56] References Cited

U.S. PATENT DOCUMENTS 3,729,788  5/1973  Tawa ..................... 29/116 AD
3,731,357  5/1973  Shirai ................... 29/116 AD
3,745,625  7/1973  Jaegers et al. ........ 29/116 AD

FOREIGN PATENT DOCUMENTS 2100928  7/1972  Fed. Rep. of Germany ........ 29/116 AD Primary Examiner—Carl E. Hall
Assistant Examiner—John Burtch
Attorney, Agent, or Firm—Roylance, Abrams, Berdo & Goodman

[57] ABSTRACT

A pressure roller (1) with longitudinal axis of variable shape, in which an outer jacket (2) is supported in central position by an inner shaft (3) running essentially coaxially to the said jacket (2) in effective contact with ball bearings (5) carried in turn by the said shaft (3), whose end bushings 8 support the said jacket (2) by means of further ball bushings (10), one at each end; each round bushing (8) being so arranged that they are adjustable with respect to an eccentric journal (6) fixed to the corresponding end of the inner shaft (3) and eccentric to the said shaft.

4 Claims, 1 Drawing Figure

U.S. Patent
Oct. 23, 1984
4,477,954
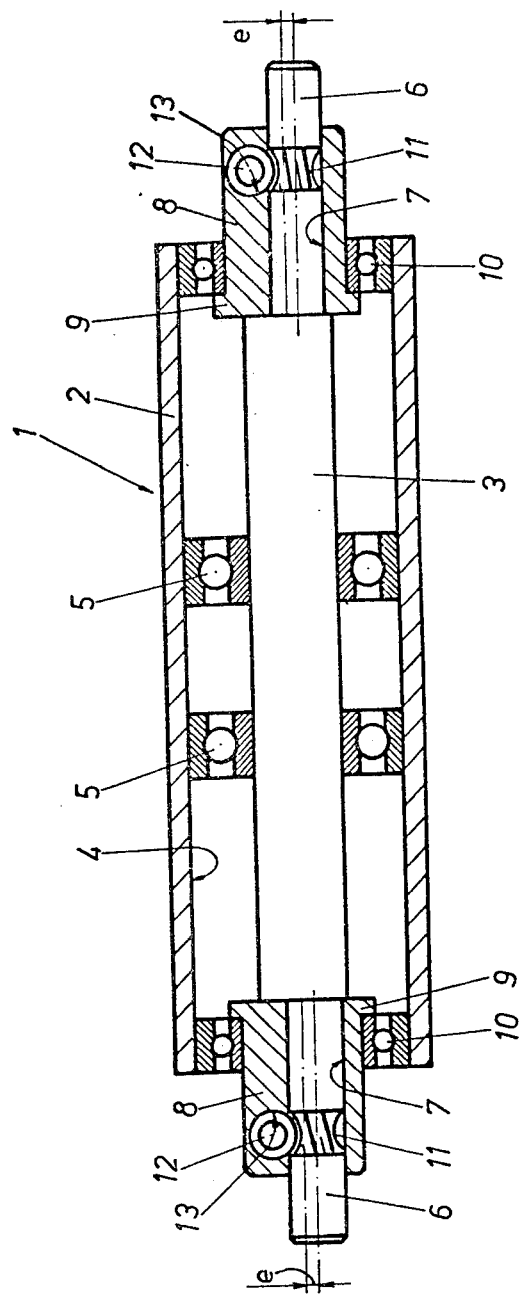

PRESSURE ROLLERS WITH LONGITUDINAL AXIS OF VARIABLE SHAPE

FIELD OF THE INVENTION

This invention relates to pressure rollers having an axis of variable shape and, in particulare to gravure pressure rollers. The invention relates in particular to a pressure roller used with a mobile contact surface, in general a cylindrical contact surface, for transmitting to the same a given pressure intended to be uniform along the contact line.

BACKGROUND OF THE INVENTION

This invention is advantageous for pressure rollers used in rotocalco-gravure machines with the rollers having a relatively great operating length and in which the possible deflection caused by the dead load of the roller as well as that of the said contact surface may result in irregular contact points between the said surface and the corresponding pressure roller. In similar cases, the contact pressure is not uniform along the contact surface but results to vary from position to position along the contact line. These variations are in general a function of complex laws, and result in minimum pressures at the mid-part of the pressure roller. If it is necessary to reduce this minimum to an acceptable preset level, the pressure of the roller must be increased to obtain an acceptable average pressure along the jacket line, where the average pressure is normally a multiple value of the said minimum pressure.

SUMMARY OF THE INVENTION

This invention now proposes a pressure roller whose jacket line can be deflected in such a manner that it counterbalances the deflection of the corresponding contact surface, with the said deflection being independent of the stresses acting between the said contact surface and the pressure roller during the effective contact.

This result according to this invention is obtained by a pressure roller with an axis of variable shape, in which the outer cylindrical jacket is seated coaxially on an inner, with respect to the jacket, shaft rotatingly connected with the mid-part of the inner surface of the jacket, and being provided, still further, with two cylindrical end pieces seated on the shaft, each end piece being rotatingly connected with one end of the inner surface of the jacket, and which each end piece is arranged in an angular adjustable manner on the corresponding eccentric shaft projecting axially and eccentrically from the corresponding end of inner shaft.

Further characteristics and advantages of this invention can be learned from the following description and on hand of the accompanying drawing.

BRIEF DESCRIPTION OF THE DRAWINGS

The accompanying is a schematical longitudinal section of an embodiment of the pressure roller of the invention.

DETAILED DESCRIPTION

In the said drawing, the FIGURE 1 is the pressure roller as such according to this invention. The pressure roller 1 consists of an outer cylindrical jacket 2 containing at the inside a radially seated inner shaft 3 of cylindrical shape. The axis of the said shaft 3 is essentially coaxial to the axis of the jacket 2.

The central part of the shaft 3 is rotatingly contacted through two ball bearings 5 with the inner cylindrical surface 4 of the jacket 2. The inner ring of each ball bearing is dynamically coupled to the shaft 3 and the outer ring of each ball bearing is dynamically coupled to the inner surface 4 of the jacket 2. From the opposite ends of the shaft 3 project axially journals 6, coaxial one to the other. The axes of these journals 6 have an eccentricity equal to (e) with respect to the axis of the shaft 3. Each journal 6 passes rotatingly through a through hole 7 in longitudinal direction provided always in eccentric position within the corresponding cylindrical body 8, also characterized by the same degree of eccentricity (e). The end of each cylindrical body 8 projects from the jacket 2 with the other being seated within the inside of the jacket 2, being provided with a flange 9 acting as shoulder for the inner ring of a ball bearing 10 whose outer ring contacts the end of the inner surface 4.

In an inner part of each journal 6 within the inside of the corresponding through hole 7 is a helical toothing 11 engaging a worm screw 12 adjustable from the outside and rotatingly supported inside a hole 13 passing through the cylindrical body 8 and ending at the corresponding hole 7.

The free end of each journal 6 projects from its cylindrical body 8 and is seated on a suitable support (not shown) for the pressure roller 1.

The pressure roller according to this invention functions as follows: the worm screw 12 makes it possible to vary the angular position of the cylindrical body 8 with respect to the corresponding journal 6. It is thus possible to move the cylindrical body 8 into a position crosswire to shaft 3, from the position shown in the drawing having the cylindrical body 8 coaxial to the said shaft 3, ensuring thus for the cylindrical body 8 an eccentricity of 2e with respect to the shaft 3.

It follows therefrom that it is possible by rotating the body 8 in one or the other direction with respect to the corresponding journal 6, through any angle between 0° and 180°, to obtain a displacement of the ends of the jacket 2 against the mid-part thereof equal to a maximum of 2e, that is deflect the jacket 2 in a very simple and secure manner from 0 to 2e, independent of the value of the pressure between the pressure roller 1 and the contact surface (not shown), with the deflection running tangential to a jacket line.

What I claim is:

1. A pressure roller having an axis of variable shape, in which an outer cylindrical jacket (2) is arranged coaxially on an inner shaft (3) with the shaft dynamically interlinked with the central part of the inner surface (4) of the said jacket (2) and provided in turn with two cylindrical end parts (8) received by the shaft (3) and dynamically interlinked each with one end of the inner surface (4) of the said jacket, and with each cylindrical end part (8) being angularly adjustable on a corresponding eccentric shaft (6) projecting axially and eccentrically from the corresponding end of the inner shaft (3).

2. A pressure roller according to claim 1, in which the inner shaft (3) and the cylindrical end parts (8) possess a radial clearance within the inside of the jacket (2) and result to be dynamically interlinked with the inner cylindrical surface (4) of the said jacket by means of ball bearings (5, 10).

3. A pressure roller according to claim 1, in which each journal (6) is rotatingly received by a hole (7) passing axially through the corresponding cylinrical body (8) and being provided with respect to the said body with an eccentricity (e) equal to that of the corresponding journal (6) to shaft (3).

4. A pressure roller according to claim 3, in which there are provided actuating means (11, 12) inserted between the cylindrical body (8) and the corresponding journal (6) for varying the angular position of the single parts.

* * * * *